E. W. ROSE.
MILK PAIL HOLDER.
APPLICATION FILED MAR. 12, 1910.
976,498.
Patented Nov. 22, 1910.
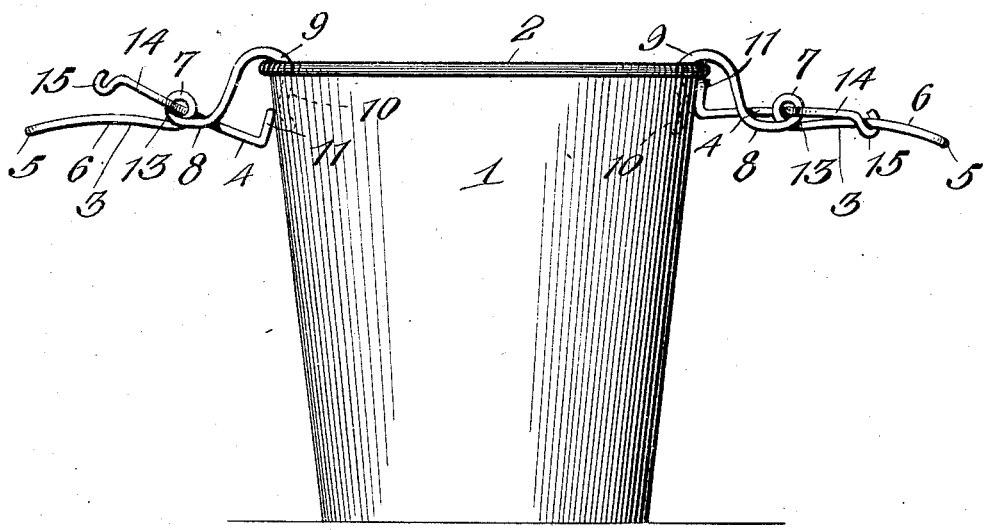
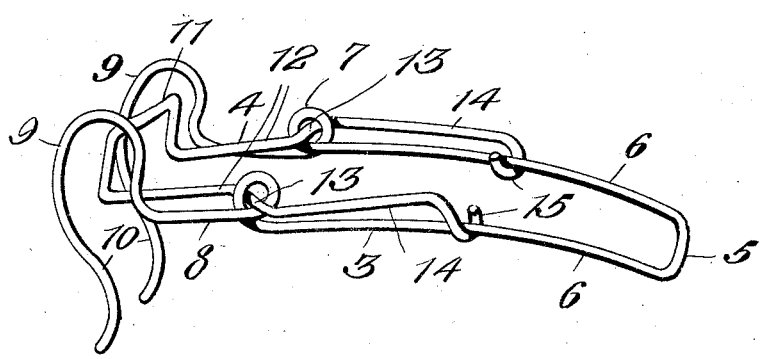
Witnesses
Chas. L. Griesbauer.
E. M. Ricketts
Inventor
E. W. Rose,
By Watson E. Coleman.
Attorney

UNITED STATES PATENT OFFICE.

EARL WAYNE ROSE, OF CUBA, NEW YORK.

MILK-PAIL HOLDER.

976,498.

Specification of Letters Patent. Patented Nov. 22, 1910.

Application filed March 12, 1910. Serial No. 548,854.

*To all whom it may concern:*

Be it known that I, EARL WAYNE ROSE, a citizen of the United States, residing at Cuba, in the county of Allegany and State of New York, have invented certain new and useful Improvements in Milk-Pail Holders, of which the following is a specification, reference being had to the accompanying drawings.

This invention relates to improvements in milk pail holders and more particularly to attachments for application to ordinary milk pails whereby the latter may be supported on the knees during the operation of milking a cow.

The object of the invention is to provide a simple and practical attachment of this character which may be quickly and easily applied to or removed from ordinary milk pails, and by means of which the latter may be effectively and securely supported.

With the above and other objects in view, the invention consists of the novel construction, combination and arrangement of parts, hereinafter fully described and claimed, and illustrated in the accompanying drawings in which:—

Figure 1 is a side elevation of a milk pail showing two of the attachments applied thereto, one being in its open position about to be applied, and the other being in its locked or fastened position; and Fig. 2 is a perspective view of one of the attachments showing it in locked or closed position.

Referring more particularly to the drawings 1 denotes a milk pail having around its upper edge the usual outwardly projecting, annular bead or flange 2.

The improved holders or attachments are applied to opposite sides of the pail and each comprises a body member 3 having at one end an arm to rest upon the knee, and at its other end one or more jaws to take over the edge of the pail and engage the inner face of the wall of the same. Each of the devices also comprises a lever 4 pivotally mounted intermediate its ends on the body member and having at its inner end a jaw to oppose the jaw on the body member and engage the outer face of the wall of the pail and the bead 2, the other end of the lever being adapted to be locked to retain the device in its closed or effective position.

In practice I preferably make the body member 3 from a single piece of resilient wire of suitable weight but it will be understood that the same may be otherwise constructed. When made from a piece of wire, the latter is bent upon itself at its center to provide a cross portion 5 which unites two longitudinally curved and substantially parallel portions 6 which form the supporting arm adapted to rest on the knee of the user, said portion 6 being curved longitudinally to prevent the device from slipping off of the knee. The intermediate portions of the wire are bent to form oppositely arranged loops or eyes 7 which serve to give the body greater resiliency, and also has hinge eyes for the lever as presently explained. The end portions of the wire extend from the eyes or loops 7, as shown at 8, and are then bent to form substantially U-shaped hooks 9 which take over the edges of the pail and provide resilient jaws 10 for the body member. These jaws 10 are curved longitudinally so that they may be readily engaged with the pail and will not scratch or wear the same. The lever 4 is also preferably but not necessarily constructed from a single piece of resilient wire as shown. When thus made, the wire has its central portion bent to provide a U-shaped jaw 11, the parallel arms of which are disposed vertically for engagement with the outer side of the wall of a pail, while the connecting portion of which is disposed horizontally and given a slight longitudinal curvature to engage the bottom of the rib or flange 2. From the jaw 11 the two portions of the wire extend in parallel relation as shown at 12, and lateral offsets 13 are formed in these portions or arms 12 to pass through the coils or eyes 7 and serve as pivots for the lever 4. The two end portions 14 of the wire extend from the offsets 13 in substantial parallel relation to provide spring arms, the extremities of which are bent to form laterally and inwardly turned hooks 5 to be sprung into engagement with the arm portions 6 of the body member to lock the lever in its effective or clamping position, as will be understood on reference to Fig. 1.

In using the invention the device is applied to the pail, as shown on the left hand side of Fig. 1, that is, by hooking the jaws 10 over the upper edge of the pail when the lever is in its open position. The lever is then swung to its closed position, as shown on the right hand side of Fig. 1, and the hook arms 14 of the lever are sprung downwardly and their extremities 15 are engaged with the arm portions 6. When the lever is thus arranged its jaw 11 will engage the outer side of the pail and the rib or bead 2, while the jaws 10 of the body member bear against the inner face of the wall, the resiliency of the wire or other material from which the device is formed retaining the parts in firm engagement with the pail so that the device will effectively support the latter.

It will be noted that the device may be applied at any point around the upper edge of the pail and to pails of different sizes.

The peculiar construction of the device enables it to be produced at a small cost and allows it to be quickly and easily applied or removed. Furthermore, the construction is such that there are no parts extending across the top of the pail to obstruct the flow of milk.

Various changes in the form, proportion and arrangement of parts may be made within the spirit and scope of the invention.

Having thus described the invention, what is claimed is:

1. A device of the character set forth comprising a body member to rest on the knee and having side portions and a jaw, the latter being arranged at one of its ends and adapted to take over the edge of a pail and engage the inside of the same, a lever fulcrumed on said body member, and having a jaw opposed to the first named jaw and adapted to engage the outside of the pail, and resilient parts at the outer end of said lever, and provided with laterally projecting hooks to engage the side portions of the body member.

2. A device of the character set forth comprising a body member to rest on the knee and having at its inner end an upright hooked shaped jaw to take over the edge of a pail and engage the inside of the same, a lever fulcrumed intermediate its ends on the intermediate portion of the body member, and formed at its inner end with an upstanding inverted U-shaped jaw arranged within the jaw on said body member, and adapted to engage the outside of the pail, and the bead or rim on the edge of said pail, and means carried by the outer end of the lever to engage the body member and retain the lever in effective position.

3. A device of the character set forth comprising a body member formed from a single piece of resilient wire and having at one end an arm to rest on the knee, at its other end spring jaws to take over the upper edge of a pail and at its intermediate portion coils forming pivot eyes, and a lever fulcrumed in said eyes and having at one end a jaw to engage the outer side of the pail and at its other end a resilient hook portion to engage the arm of the body member.

4. A device of the character set forth comprising a body member having at one end an arm to rest upon the knee, at its other end a jaw to take over the upper edge of a milk pail and at its intermediate portion oppositely arranged pivot eyes, a lever formed from a single piece of resilient wire and having its intermediate portion arranged in said eyes, one of its ends formed with a jaw to engage the outer side of the pail, and its other end formed with hook portions to engage the arm of said body member.

In testimony whereof I hereunto affix my signature in the presence of two witnesses.

EARL WAYNE ROSE.

Witnesses:
E. D. PETTIT,
SHERMAN CHILDS.